United States Patent [19]

Hampl et al.

[11] Patent Number: 4,967,365

[45] Date of Patent: Oct. 30, 1990

[54] METHOD AND APPARATUS FOR ADAPTIVE CONTROL OF THE TRAJECTORY OF A WORKING PROCESS

[75] Inventors: Jan Hampl; Oldrich Taraba; Jiri Valenta, all of Prague, Czechoslovakia

[73] Assignee: ŠKODA koncern Plyzeň První brněnská strojírna koncerno podnik, Brno, Czechoslovakia

[21] Appl. No.: 282,179

[22] Filed: Dec. 9, 1988

[30] Foreign Application Priority Data

Dec. 12, 1987 [CS] Czechoslovakia ............ PV 9095087

[51] Int. Cl.⁵ .................... G06F 15/46; G06G 7/64
[52] U.S. Cl. ...................... 364/474.15; 364/474.06; 364/474.17; 364/474.24; 364/474.32
[58] Field of Search ............... 364/474.15, 474.17, 364/474.18, 474.32, 474.35, 474.24, 474.06; 318/572

[56] References Cited

U.S. PATENT DOCUMENTS

| 4,441,103 | 4/1984 | Urabe | 340/680 |
| 4,484,413 | 11/1984 | Yamamoto et al. | 51/165.71 |
| 4,554,495 | 11/1985 | Davis | 318/572 |
| 4,562,392 | 12/1985 | Davis et al. | 318/572 |
| 4,617,503 | 10/1986 | Davis et al. | 318/572 |
| 4,620,281 | 10/1986 | Thompson et al. | 364/475 |
| 4,631,683 | 12/1986 | Thomas et al. | 364/474 |
| 4,656,868 | 4/1987 | Azuma et al. | 73/587 |
| 4,723,219 | 2/1988 | Beyer et al. | 364/474 |
| 4,807,145 | 2/1989 | Takahashi et al. | 364/474.17 |

FOREIGN PATENT DOCUMENTS

| 2163850 | 3/1986 | United Kingdom . |
| 2166242 | 4/1986 | United Kingdom . |
| 2176606 | 12/1986 | United Kingdom . |
| 2177205 | 1/1987 | United Kingdom . |

*Primary Examiner*—Jerry Smith
*Assistant Examiner*—Jim Trammell
*Attorney, Agent, or Firm*—Notaro & Michalos

[57] ABSTRACT

A method and apparatus are provided for adaptive control of the path of movement of a working tool during a working process wherein an acoustic signal is generated responsive to contact of the working tool with the workpiece and wherein stochastic signals are picked up during the course of the working process. On the basis of characteristic features of these signals the path of the working tool is corrected in order to maintain required conditions of the working process.

5 Claims, 2 Drawing Sheets

METHOD AND APPARATUS FOR ADAPTIVE CONTROL OF THE TRAJECTORY OF A WORKING PROCESS

FIELD OF THE INVENTION

The invention relates to a method and apparatus for adaptive control of the trajectory or path of movement of a working process during the working of a workpiece by a tool.

BACKGROUND OF THE INVENTION

A number of different auxiliary or additional arrangements, utilizing a number of different principles and designed to facilitate the control of a working process, are used during the course of many machining operations. These arrangements basically comprise some form of auxiliary means for enabling control of the shape of an object, based on copying or on indications of the position of the worked object and of the tool, or arrangements for measuring torques, the supply of power and the regulation of power supplied to the driving motor of a drive shaft, of drives of individual movable axles and the like, and further for adjustment of the position of a working tool. Some methods also use acoustic transmissions generated during the course of an operation to control the path of movement of a working tool.

However, prior art methods and corresponding arrangements do not solve the problem of providing adaptive control of the working process, particularly in connection with digitally controlled machine tools. In other words, it is not possible with prior art systems to follow changes in the directions of movements of machine tools, particularly of grinding tools, and to still provide adaptive control of a technological process with regard to a required geometric shape for a given object and further, with regard to a predetermined course of working, to secure maintenance of the surface conditions, strength and other structural or physical properties of the material of the workpiece.

SUMMARY OF THE INVENTION

It is an object of this invention to provide a method and apparatus for adaptive control of the path of relative movement of a working tool in a working process, utilizing for this purpose stochastic signals generated during the course of the system operation According to the invention, ultrasonic stochastic signals generated during the course of contact between the working tool and the workpiece are picked up and the path or track of the working tool is corrected based on characteristic features of the pick-up signals so as to maintain or produce the required geometric shape of the workpiece and so as to also meet and maintain requirements of the working process and of the technological working conditions The apparatus of the invention comprises, in addition to other components or units, a positioning device connected to the working tool and also connected to a control system, and a reference member or dimension etalon, and associated with ultrasonic pick-up means affixed to the base of the machine tool, a shaping device, with a corresponding pick-up device also being affixed to the base. The outputs of the pick-up devices are connected to individual inputs of a controlled analog evaluation unit. At least one further ultrasonic pick-up device is affixed on a mounting or fastening device for the workpiece, the output of each further pick-up device being connected to an independent input of the controlled analog evaluation unit. The outputs of the evaluation unit are connected by way of an analog digital processor to the input of a computer system, which itself is connected to the control system of the machine tool. The computer system is also connected to an input of the controlled analog evaluation unit for signalling the occurrence of extraordinary conditions and/or breakdown conditions.

It is advantageous to affix, to the base of the machine tool, a dressing or shaping device, a testing sample or example for testing of the quality of the working tool, and also a transducer, and a transmitter, the input of which is by way of a generator connected to a computer system in order to measure and check the acoustic and electrical transmission channels.

It is furthermore possible to connect to this computer system a superposed computer with an implemented CAD/CAM capability.

An advantage of the method and apparatus according to the invention is that the invention enables automatic adaptive control of a working process during the course of machining, wherein the stipulated (preselected or required) technological conditions of the working process and of the workpiece are taken into account. The apparatus also enables prior measurement of the dimensions of the working tool and adjustment of the shape thereof by means of a dressing or shaping device and, by means of an independent transducer and generator, checking of the operation and readiness of the system. After checking or determination of the dimensions of the working tool, the system is capable of determining, with high accuracy, the starting position of a workpiece situated on and/or affixed to the machine tool. A high accuracy is achieved in measuring of the working tool, this accuracy being better than 1 $\mu$m. Further, the invention enables achievement of the required accuracy of dimensions of the workpiece, including its physical properties such as, for instance, strength and structure of surface layers of the material of the workpiece.

The apparatus of the invention uses ultrasonic stochastic signals, advantageously within the range of 40 to 200 kHz. Both determination of dimensions of the working tool and also of the workpiece, the intermediate evaluation and the following of the working process and control of the course of the technological working process and of its control, are based on this principle.

The information about the controlled process are based on characteristic features of the ultrasonic stochastic signals processed by a controlled analog evaluation unit, by an analog digital processor and by a computer system in order to determine and maintain working conditions according to stipulated (predetermined or required) technological parameters. The intensity and character of the transmitted ultrasonic signal determine the course and parameters of the working operation, and are utilized for checking thereof and for adaptive control of the working process according to stipulated parameters, to provide the effective utilization of the working tool and to achieve the required quality of the workpiece (e.g., with respect to geometry, surface, structure of material, internal stress and the like).

Other features and advantages of the invention will be set forth in, or apparent from, the detailed description of a preferred embodiment of the invention which follows.

BRIEF DESCRIPTION OF THE DRAWINGS

The method and apparatus for adaptive control of the trajectory of the working process according to the invention will be described below in detail in connection with the drawings, wherein.

DESCRIPTION OF THE PREFERRED EMBODIMENTS

Figure 1:
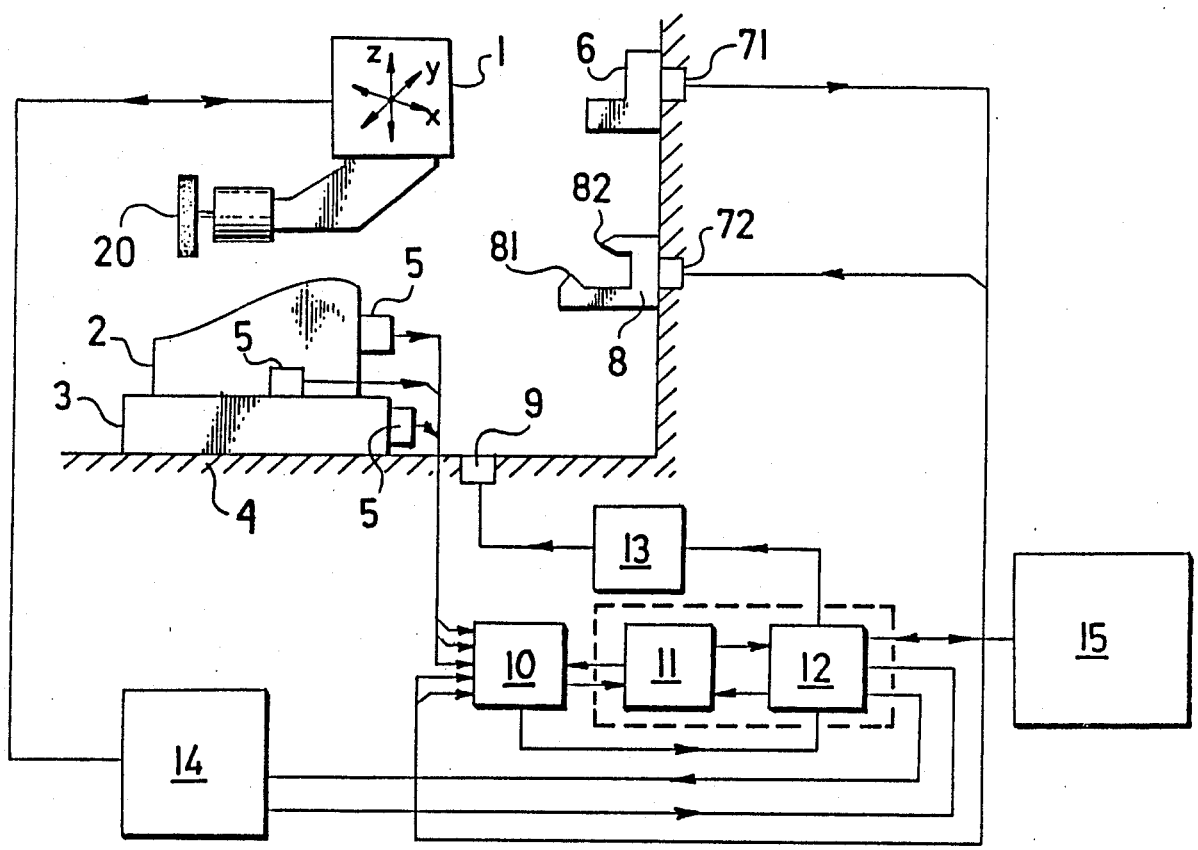
FIG. 1 shows diagrammatically the interconnection of different elements or units of the arrangement according to the invention.

With reference to FIG. 1, a fastening device 3 is situated on a base 4 of a machine tool, with a workpiece 2 being affixed to the fastening device 3. Two pick-up devices 5, for detecting ultrasonic stochastic (random variable) signals are, in this embodiment, affixed to the fastening device 3, with another pick-up device 5 being located or situated directly on the workpiece 2.

The pick-up devices for ultrasonic stochastic signals utilize piezoelectric materials and are most sensitive within the frequency range 40 kHz to 1 Mhz. A preamplifier (not shown) with impedance adjustment is included as part of each pick-up device 5. The number of pick-up devices 5 used depends on the type or kind of applied technological process, the size of the workpiece, the tool used, and the actual working conditions.

The outputs of pick-up devices 5 are connected to the inputs of a controlled analog evaluation device 10, the output of which is connected by way of an analog digital processor 11, to a computer system 12, the latter being, in turn, connected to a control system 14 of the machine tool. The controlled analog evaluation device 10 comprises, for example, an amplifier, the gain of which is controlled by the analog digital processor 11. Several parallel units can be provided upstream of this controlled amplifier to produce an analog evaluation of individual parameters of ultrasonic stochastic signals, particularly the mean, the high, the effective value, the shape factor of the signal and the like. Thus, data is further processed and evaluated by the analog digital processor 11.

The analog digital processor 11 controls the selection of the transmission channel of the analog evaluation unit 10, and furthermore processes the resultant analog characteristic values from the analog evaluation unit 10 using suitable software. On the basis of the evaluation thereof the data is transmitted to a superposed computer 12, or are directly compared in the unit by the analog digital processor 11, with parameters of the technological operating process, and on the basis of the result, the computer system 12 controls the control system 14 of the machine tool according to actual and predicted values of the technological process.

The computer system 12 is also connected to the output o the controlled analog evaluation unit 10 in order to directly indicate breakdown conditions. A positioning device 1 connected to the working tool 20 is also connected to the control system 14. A shaping or dressing device 8 for the working tool device has an associated pick-up device 72 for ultrasonic stochastic signals which is also mounted in the base 4 of the machine tool, the output of pick-up device 72 being connected to an input of the analog evaluation unit 10. A dimension etalon or reference member 6 with an associated pick-up device 71 for ultrasonic stochastic signals also has the output thereof connected to an input of the analog evaluation unit 10 for further processing. The gain of the controlled analog evaluation unit 10 is adjusted according to technological working conditions and according to actual conditions of the operating process by the computer system 12.

As noted, another input to the controlled analog evaluation unit 10 is provided by a signal from the pick-up device 71 of ultrasonic stochastic signals which is affixed to the dimension etalon (reference member) 6, the latter being situated in a precisely defined location the coordinates of which are preestablished. The dimension etalon 6 is fabricated of very hard material, which is not subject of wear with respect to dimensions thereof due to contact with the working tool. Thus, the wear on the dimension etalon 6 in the course of prolonged contact with the working tool 20 is negligible and in case of a very prolonged measuring process a highly accurate statistical correction can be provided. The wear on the working tool 20 (i.e., the change in dimensions and required correction) can be very simply determined from known absolute dimensions of the etalon 6 and of the positioning device 1 of the working tool 2 at the moment of contact. Contact is established solely in order to determine the dimensions of the working tool 20.

During control of the measuring and operating process by the computer system 12, the time sequence within which a predetermined signal from the pick-up devices 5 can occur is determined by the computer program on the basis of what breakdown conditions are to be prevented. Consequently, the computer system 12 controls pick-up of the ultrasonic stochastic signals from pick-up devices 5, 71 and 72, and also controls a generator 13 which feeds a transducer 9, by means of which it is possible to determine the preparedness and working conditions of the operating system. The transducer 9 controls, prior to initializing system operation, and on the basis of the generated ultrasonic stochastic signals, the state of pick-up devices 71 and 72 and of further pick-up devices 5 and checks the correct operation of the acoustic and electric transmission channels.

It is possible to provide evaluation of the course of the technological process according to the kind of workpiece 2, of the working tool 20 and of the course of the process to also utilize signals from a number of pick-up devices 5, whereby the manner of operation of these signals can be controlled by suitable programs. For example, a summed, differential or like signal can be picked-up, thus decreasing the sensitivity of the system to disturbing influences. According to stipulated or predetermined technological parameters of the process it is possible to adjust, by use of the computer system 12, prior to and during the course of operation, the parameters of the controlled analog evaluation unit 10 s that the digital signal has the required dynamic and corresponds to the stipulated technological process. The computer system 12 also enables transmission and reception of information directly from the control system 14 of the machine tool, which thereafter controls the positioning device 1 and associated working tool 20.

Prior to starting the technological process and after measuring the dimensions of the working tool 20, the parameters of the coordinate system of the workpiece can be determined by the working tool 20 in relation to the coordinate system of the positioning device 1 and the associated working tool 20 and these values transmitted to the computer system 12 or 15 by way of the control system 14 of the machine tool, at which it is possible to evaluate differences and perform the necessary transformations of the coordinate system of the machine tool and of the workpiece and to provide generation of correct trajectories or movements of the working tool 20 according to the mathematic model of the workpiece and of the stipulated technological working process.

Checking of the quality of the working tool 20 is ascertained either on a material testing sample situated on a defined place of the clamping part of the machine tool or on a defined place of the workpiece. Evaluation of the working properties (e.g., blunting or sealing of a grinding tool) is generally performed by measuring the time during which the tool removes, from the test sample, a predetermined amount of material, whereby the removal of material is controlled by acoustic emission. In a case where the measured time is longer than the allowed time limit in comparison with the stipulated value or with the starting (reference) measurement, the system provides for dressing or other processing of the existing grinding tool to provide the necessary correction thereof, or for simply changing of the working tool.

It is possible to connect to the computer system 12 a superposed computer 15 with an implemented system CAD/CAM which thus enables the provision of a mathematic model of the workpiece and its transformation.

One aspect of the method according to this invention also concerns the control and the checking of the shape of the working tool 20, particularly of a grinding disk, wherein the control system transfers said grinding disk to a selected location or station at which a dressing and shaping device 8, with associated diamond dressing extensions 81 and 82, is provided and, based on the present shape of the grinding tool and the ascertained starting dimensions thereof, dressing of the tool 20 is performed. For this purpose, dressing extensions 81 and 82, as illustrated, are suitable. The relative paths or trajectories of dressing extensions and the grinding tool can be controlled during the course of dressing. The shaping operation is monitored by means of a signal from the pick-up device 72 situated on the dressing device so that no interruption of transmission of the signal can take place during the course of the shaping process. In a case wherein interruption of the signal occurs prior to finishing the shaping process, a new transformation of the path or trajectory of the shaping curve of the required profile of a grinding tool has to be made and a new shaping process, with changed parameters based on current checking of the level of the pick-up signal from the pick-up device 72, must be performed again from the start.

It will be evident from the foregoing that the operation need not proceed from the beginning in accordance with a predetermined path or trajectory by a part program, but can proceed according to a newly determined trajectory which provides maintenance of accurate conditions of the working process 8, for instance, the same removal of material, the same pressure or the like, with respect to the physical properties of the material and also simultaneously of the final dimensions of the workpiece 2.

One of the established and ascertained properties of a stochastic ultrasonic signal is the dependence thereof on changes of characteristic features of the signal based on the magnitude of the removed amount of material (from a layer) of the workpiece. A method which enables this property of ultrasonic stochastic signals to be utilized in practice is indicated in FIG. 2 and 3 of attached drawings.

Figure 2:
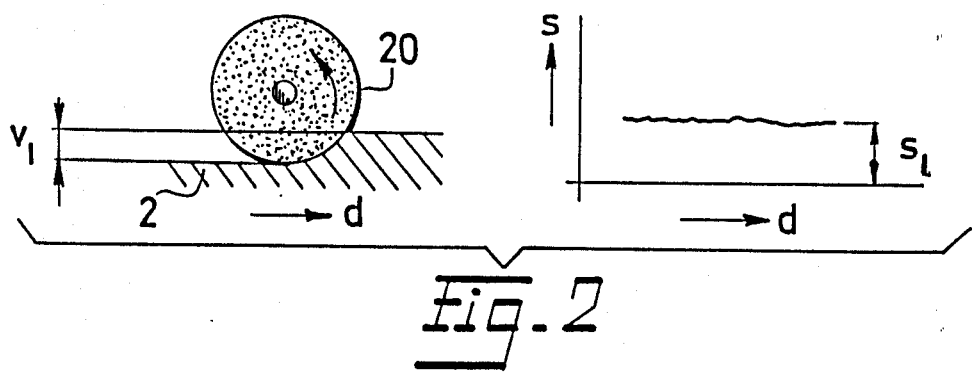
FIGS. 2 and 3 indicate, in elevation, an application of this method and the practical significance of utilization of, for instance, the dependence of a change of the magnitude of the level of an ultrasonic stochastic signal on the magnitude (thickness) of a layer of removed material.

FIG. 2 shows, in elevation, a working process wherein a grinding disk 20 is supposed to remove, from a workpiece 2, a layer $V_1$ the thickness of which is prescribed by stipulated or preselected technological conditions or requirements. In such a case the output signal from the respective pick-up device corresponds to a level $S_1$ as shown in the right hand portion of FIG. 2.

Figure 3:
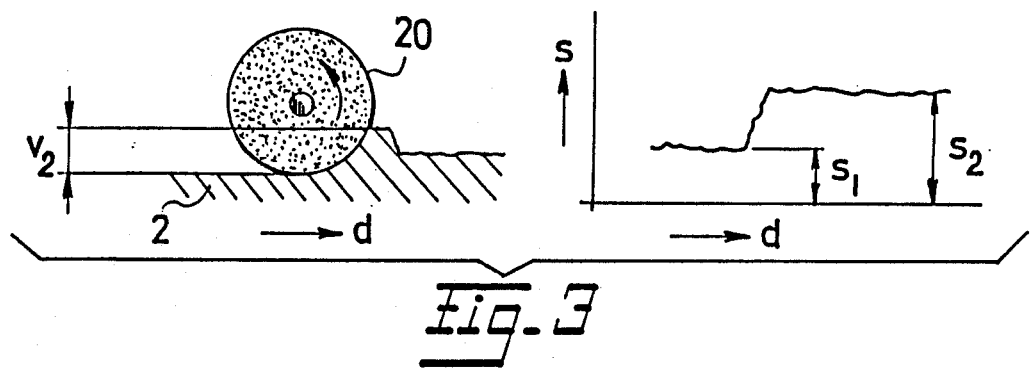

In a second case according to FIG. 3, a similar process is shown, wherein, however, due to the presence of a boss, a projection or the like, a layer $V_2$ of larger thickness must be removed, so that originally stipulated technological conditions are not fulfilled. For example, the stipulated technological conditions for control of the working process of the workpiece may be set to provide removal of only a layer $V_1$ of the material from the workpiece 2. Because in this case it is necessary to apply the technological process as described in the first case, it is necessary to prepare a new path of movement or trajectory for the working tool 20. In the second case, according to FIG. 3, a higher value of the level of signal $S_2$ corresponds to the change of thickness of the removed layer of material to the value in $V_2$ whereby the thickness of the removed layer $V_2$ is larger than the thickness of the removed layer $V_1$. Therefore, the level of the signal $S_2$ is also higher than the level of the signal $S_1$. The computer system L 12, based on the magnitude of the level of signal $S_1$, prescribes a new trajectory for the working tool 20 in such a manner that no greater removal of material from the workpiece than is required by the technological conditions is achieved. The new trajectory or both of the working tools is calculated so that the required dimensions of the workpiece 2 are obtained in the final working phase.

The method and arrangement according to this invention can be used in particular in machinery, especially for control of a machine tool of an industrial robot where an increased accuracy is required in producing curved surfaces (for instance, in connection with the blades of rotary machines), or in connection with the making of dies, bottom discs, forms for pressure casting and the like. The invention is of particular importance in connection with the finishing, by grinding, of irregular curved surfaces, particularly of objects made of hard metallic and non-metallic material (such as ceramic material), for polishing, lapping and the like.

Although the present invention has been described relative to an exemplary embodiment thereof, it will be understood by those skilled in the art that variations and modifications can be effected in this exemplary embodiment without departing from the scope and spirit of the invention.

What is claimed is:

1. A method for the adaptive control of a path followed by a grinding working tool during a working process on a workpiece in order to maintain technological parameters of this working process wherein, during the course of the working process an acoustic transmission is generated in response to contact of the working tool with the workpiece, said method comprising:

determining the dimensions of the working tool by coordinates of a positioning device at the moment of contact of the working tool with a hard non-wear reference member having pre-established coordinates to remove material from the working tool, identifying the workpiece in a working space of the machine tool and determining the dimensions of the workpiece using acoustical signals, calculating, based on the identification of the workpiece in the working space and on a predetermined mathematic model, an optimum starting path for the working tool of the working process, monitoring the working process using acoustical signals, a control apparatus responsive to the signals and technological parameters and based on a comparison between the predetermined actual technological parameters, establishing at least one new path for the working tool, measuring, as required, when there is wear of the working tool, the actual dimensions of the working tool using the determining step and based on this measurement, providing a correction of the working tool and thereafter determining a new path of movement for the working tool, and repeating, as required, the aforementioned operations over the course of the working process, as often as is necessary to obtain a required result while still maintaining the technological parameters.

2. Apparatus for providing adaptive control of the path of relative movement between a machine tool and a workpiece, said apparatus comprising a base for said machine tool, a fastening device on said base on which the workpiece is mounted, a reference member for the working tool affixed to said base, an analog evaluation unit, an analog digital processor, a computer system, a control system for the machine tool and a plurality of pick-up devices for detecting ultrasonic stochastic signals, said plurality of pick-up devices comprising a first pick-up device connected to the reference member for producing a signal when said machine tool contacts the reference member and having an output connected to a first input of the analog evaluation unit, and at least one further pick-up device disposed on the fastening device and having an output connected to a second input of the evaluation unit, an output of said evaluation unit being connected by way of the analog digital processor to an input of the computer system, one output of said computer system being connected to the control system for the machine tool, and another output of the computer system being connected to an input for controlling the analog evaluation unit.

3. An apparatus as in claim 2 wherein a shaping and a dressing device for the working tool is affixed on the base of the machine tool for providing effective shaping of the working tool to the required shape.

4. An apparatus as in claim 2 further comprising a transducer affixed to the base of the machine tool and having an input connected with the output of a control signal generator, the input of said generator being connected to a further output of the computer system for performing an diagnostic and adjustment of the apparatus for adaptive control.

5. An apparatus as in claim 2 further comprising a superposed computer with an implemented system CAD connected to said computer system.

* * * * *